March 7, 1972   G. DE VARDA ET AL   3,647,673
STEPPED BOTTOM FOR MULTICELL FURNACE FOR PRODUCTION
OF ALUMINUM BY ELECTROLYSIS
Filed March 24, 1969   2 Sheets-Sheet 1

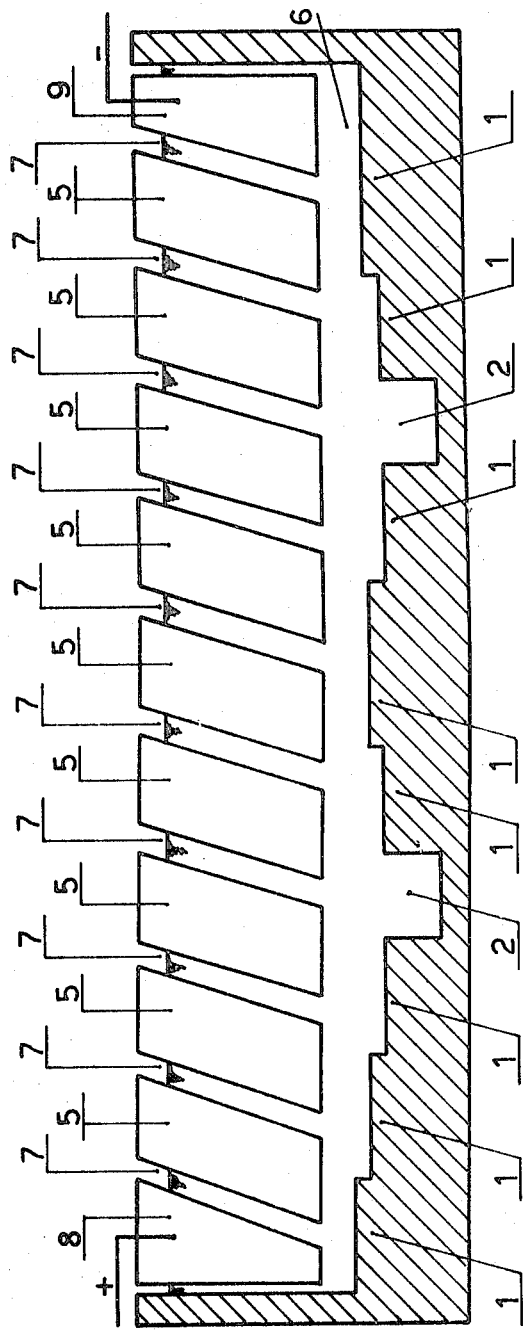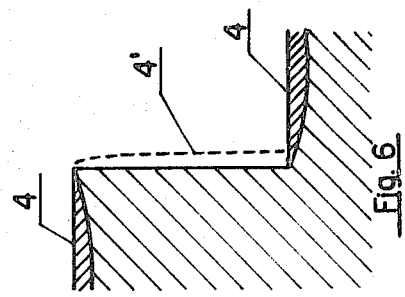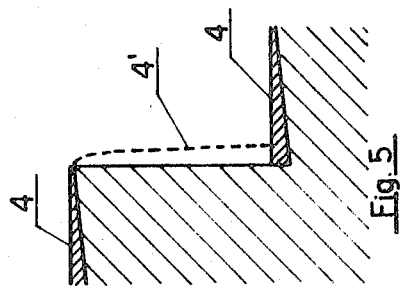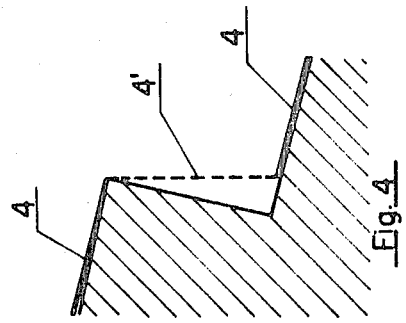

United States Patent Office 3,647,673
Patented Mar. 7, 1972

3,647,673
STEPPED BOTTOM FOR MULTICELL FURNACE FOR PRODUCTION OF ALUMINUM BY ELECTROLYSIS
Giuseppe de Varda and Alberto Vajina de Pava, Milan, Italy, assignors to Montecatini Edison S.p.A., and Giuseppe de Varda, both of Milan, Italy, fractional part interest to each
Filed Mar. 24, 1969, Ser. No. 809,852
Claims priority, application Italy, Mar. 26, 1968, 14,381/68
Int. Cl. C22d 3/02, 3/12
U.S. Cl. 204—244
7 Claims

ABSTRACT OF THE DISCLOSURE

Described is a multicell furnace with bipolar suspended electrodes for the production of aluminum by means of thermal electrolysis of alumina dissolved in molten baths containing fluoro compounds, equipped with a vat of refractory electrically non-conducting material, with a bottom provided with grooves or pockets for collecting and tapping the aluminum produced through the electrolysis. The furnace bottom is characterized in that said grooves or said collecting pockets are less numerous than the interspaces or cells between electrode and electrode. Furthermore, said bottom is step-shaped, every step comprising a practically horizontal surface and a practically vertical surface, the steps sloping down towards said grooves or said collecting pockets.

---

The present invention relates to an improvement in the multicell furnace with bipolar suspended electrodes for the production of electrolytic aluminum by thermal electrolysis of alumina dissolved in molten baths containing fluoro compounds.

More particularly, the present invention relates to the shape of the vat bottom of said multicell furnaces, for example the furnaces of the type described and claimed in Italian Patent No. 659,283 of the same applicants. The corresponding United States Patent is No. 3,178,363.

It is known that in the traditional old-type (with Soederberg anode or baked anodes) furnaces for the production of aluminum by thermal electrolysis of alumina dissolved in a cryolitic bath, the carbonaceous material vat and the aluminum itself act as a cathode and the produced aluminum is collected on the bottom of the vat thus forming a single continuous surface deposit. On the other hand, in the multicell furnaces as described above, the vat merely functions to contain both the bath and the metal which deposits on the bottom of the vat itself after separating on the cathodic surfaces of the bipolar electrodes and on the terminal cathode. In other words, while in said traditional old-type furnaces, the common metallic deposit is always cathodically polarized and the electric energy flows through it, this does not occur, or need not necessarily occur, in said multicell furnaces.

In the latter mentioned furnaces, on the contrary, should the continuity of the metallic deposit collected on the bottom of the vat not be interrupted, a considerable amount of electric energy gets "shunted" by the metal itself (an excellent current conductor) consequently bypassing the electrode system and therefore not being available for the electrolysis purpose.

To overcome this inconvenience it has been already proposed to suitably shape the furnace bottom, namely in such a way as to allow that the metal collects in deposits separated one from the other in a direction transversal to the direction of the electric flow passing through the furnace.

For example, in the above-mentioned Italian Patent No. 659,283, the furnace vat bottom, coated with refractory and inert material, has a shape such as to provide individual grooves extending across the vat and suitable to separately collect the metal produced by electrolysis on the cathodic surfaces of the individual electrodes as descending by gravity. These transverse grooves are made in the refractory material in correspondence with the interspaces between the electrodes. Therefore a metal collecting groove is at least available for every single interelectrodic interspace.

Alternatively, according to Italian Patent No. 802,847 and corresponding U.S. Pat. appln. No. 715,806/60, said zones collecting the molten metal can be pocket constructed (called also collection or tapping pockets) enclosed in or formed by walls or partitions of material having a high electric resistance, rising above the surface of the furnace bottom.

As regards the number of these grooves or collecting pockets conforming with the above proposals, the optimum condition for sharing the metallic deposit is that this number is at least equal to the number of the electrode interspaces and that a least a groove or collecting pocket lies below every electrode interspace, i.e. below every cell.

Said types of bottom shape according to the cited known technique, while avoiding the bypass of current through the metallic deposit, involve some inconveniences as a consequence of the plurality of the collecting pockets or grooves which are necessary for sharing the metal deposit and therefore present an absence of the bypass.

These inconveniences substantially consist in the necessity of repeating the metal cast operation as many times as there are metal collecting pockets (and for this reason so called) at various points of the furnace. This requires breaking the bath skin which forms on the surface of the electrode interspaces and in the gaps between electrodes and vat walls in several zones, consequently altering the thermal equilibrium of the furnace. Furthermore, it is necessary to displace the electrodes (the distance between them, called "interpolar space," and preferably kept at a minimum value of 5 cm.) in order to clear, above the groove or pocket interested in the collection, a space sufficient for the introduction of the tapping device. The above-mentioned operations, which must be evidently carried out with the furnace at least partially uncovered, and consequently alter the thermal equilibrium of the furnace, involve losses of time and remarkable operational difficulties. Another drawback of the pockets for the aluminum tapping or collection below every cell occurs when the separating walls, owing to cracks or infiltrations of molten metal, are no longer suited to act as electrically insulating material. In this case two or more pockets become electrically short-circuited, the current bypass increases, while the current efficiency decreases.

Now, it is an object of the present invention to present a bottom for multicell furnaces which, still maintaining the advantages attained by conventional furnaces according to the prior art, avoids the above-mentioned drawbacks. The object of the present invention is to present a bottom for multicell furnace having a refractory vat, avoiding the rise of bypass currents through the metallic deposit by interrupting the electric continuity of the metal layer on the bottom of the vat, without tapping the molten metal into a plurality of distinct pockets or grooves, and the inconveniences thereof.

In fact, we have found that it is sufficient that the bottom be stepped even with a small rise but clearly protruding steps, so that the molten aluminum which, produced through the electrolysis, deposits on said bottom in the form of a thin film, flows down towards the collecting pocket (or pockets) discontinuously, as every step causes a break in the continuity of the film or stream of the flowing liquid metal, consequently preventing any possibility of current bypassing through the metal deposit, or at least remarkably reducing the value of said bypass currents.

In this way, and this is a most important point, it is possible to reduce the number of the collecting pockets, and therefore of the tappings.

It is evident that from the above-mentioned points of view, it is preferable to have a number of collecting pocets as small as possible, to even a single collecting pocket, if possible. Of course, for fixing the number of the collecting pockets, the number of the electrode interspaces acting as electrolytic cells or, in other words, the dimensions of the furnace will be taken into consideration.

In fact, the number of the steps ending in the collecting pocket depends on the one hand on the number of cells that the collection pocket has to serve and on the other hand it is related both to the fitness of the refractory material of the bottom where the above-mentioned steps are made and to the dimensions of the bipolar electrodes. Of course, some limits in plant practice are set to the number of steps of the collection pockets and the thickness of the vat-bottom refractory material. Consequently, it is easily understood that a greater number of collection pockets will be necessary for furnaces with a great number of bipolar electrodes.

Anyhow it will be possible to operate at least three electrolytic cells, that is electrode interspaces, with a single collection pocket, which already means a decisive step towards the aimed improvement.

As regards the arrangement of the flight of steps made in the bottom, it is preferable that a step appears for every cell (except the case of a cell contingently placed above the metal collecting pocket) in such a way that the "roof" (horizontal or collecting surface) of the step corresponds to every cell, so that the roofs of two contiguous steps correspond to two contiguous cells.

It is possible to make the above-mentioned roofs or collecting surface of said steps not perfectly horizontal: for example, slightly inclined in order to favor the downflow of the metal towards the collecting pocket; or slightly inclined in the opposite way, or concave, as an overfall. The "wall of rise" (vertical side) of the step need not have a perfectly vertical but a vertically projected rise.

This and other characteristics of the present invention will be now more evidenced by the following drawings, given purely for the purpose of example and having no limiting nature, wherein:

FIGS. 4, 5 and 6 represent schematically shape variants of the steps, longitudinally sectioned;

FIG. 8 represents schematically a longitudinal section of a big multicell furnace with a stepped bottom, according to the present invention, having two collecting pockets.

Figure 1:
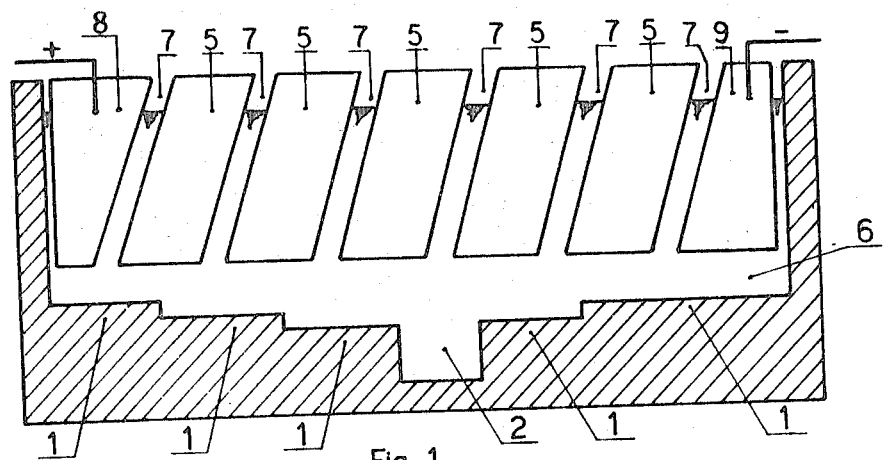
FIG. 1 represents schematically a longitudinal section of a multicell furnace provided with a stepped bottom, according to the invention, having one collecting pocket.

According to the practical embodiment of the invention illustrated in FIG. 1, the steps 1, either big or small, descend from the ends of the furnace towards the central zone of same, where a single collecting pocket 2 is placed for the collecting and the tapping of the molten aluminum which separates.

Figures 2, 3:
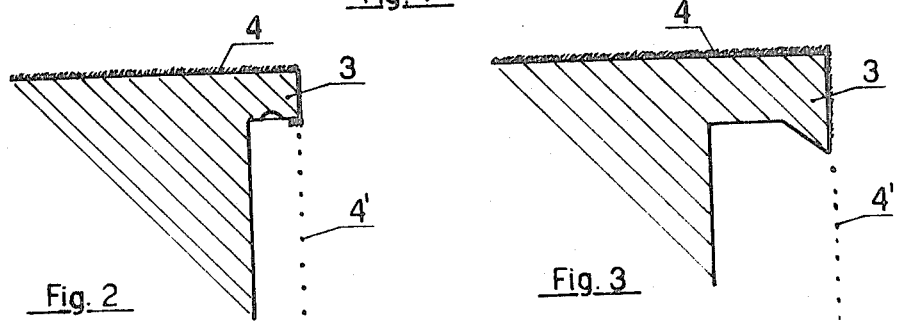
FIGS. 2 and 3 represent schematically (to a greater scale) two different types of edges for the above-mentioned steps, longitudinally sectioned.

FIGS. 2 and 3 indicate the two different types of edges 3 suitable to favor the absolutely necessary break of the thin film or metal stream 4 flowing on the surface of the step towards the step below or the collecting pocket, in drops 4'. FIGS. 4 to 6 illustrate schematically some variants of the step shape. In FIG. 4, the roof is sloped in the downflow direction and the wall leans out. In FIGS. 5 and 6 the roof is inclined or concave-shaped respectively, like an overfall. Of course, the metal collected in the recesses or cavities of the steps in FIGS. 5 and 6 immediately flows down therefrom. Therefore they have not to be mistaken for the actual metal collecting pockets which, in the invention, are called also "tapping pockets." These shapes of steps are not to be considered at all limitative, while on the other hand the shape of the roof edge and of the step rise wall as such does not fall within the scope of the present invention.

Figure 7:
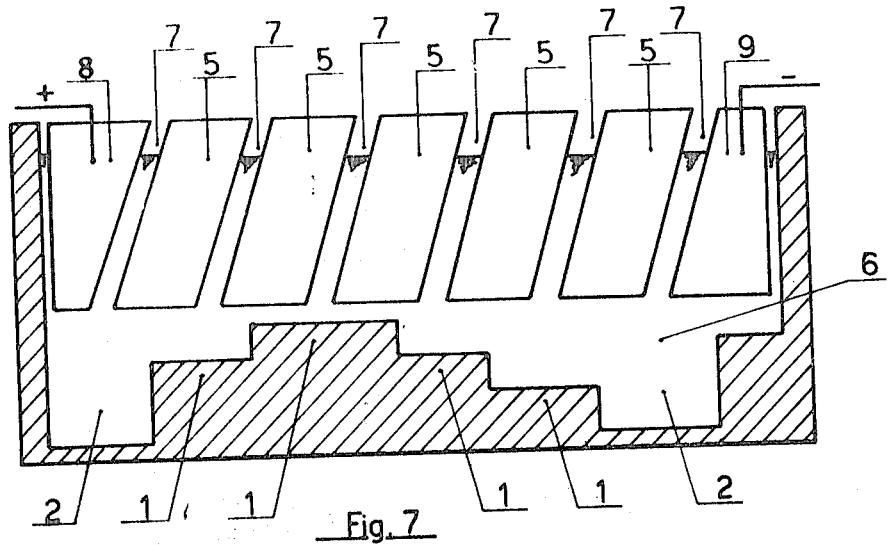
FIG. 7 represents schematically a longitudinal section of a multicell furnace with a stepped bottom, according to the present invention, having two collection pockets.

The multicell furnace schematically illustrated in FIG. 7 presents another form of practical embodiment of the present invention, with steps 1 sloping down from the central section of the furnace towards the ends thereof, where two collecting pockets 2 are arranged for collecting the molten metal. The above-illustrated shapes of the bottom are not to be considered limitative but only exemplifying since the bottom of a furnace according to the present invention can also have a recurrent construction, namely a construction repeating periodically the one of the above-mentioned furnaces.

What is meant, in the present invention, by "repeating periodically" is clearly seen in FIG. 8 which shows a furnace which may be obtained by the series joinder of two furnaces such as that represented in FIG. 1, where for example a single end anode 8 and a single end cathode 9 have been maintained.

The last specified embodiment of the present invention is particularly suitable for furnaces with a great number of cells, since, should it be necessary to realize a bottom styled as shown in FIG. 1 or FIG. 7, for a furnace of so big dimensions, the central collecting pocket or the two end collecting pockets are too far from the electrode system consisting of bipolar electrodes 5, terminal anode 8 and end cathode 9.

It is necessary to avoid the danger of the electrolytic bath 6 solidification and the clogging of the collecting pocket or pockets, as well as the consequent impossibility of practically tapping the produced metal. Using the form of practical embodiment of the present invention, schematically illustrated in FIG. 8, it is easily possible to operate ten cells with only two collecting pockets without said collecting pockets, however, being so remote from the electrolytic system to provoke the above-mentioned inconveniences.

It is to be noted that the multicell furnaces schematically illustrated in FIGS. 1, 7 and 8, represent the preferred arrangement of the flight of big or small dimensioned steps, with respect to the electrode system, that is the system letting a practically horizontal flat step roof for the aluminum collecting correspond to every electrolytic interspace (or cell) 7, so that the roofs (horizontal or practically horizontal surfaces) of two adjacent steps correspond to two contiguous cells.

Any obvious variant and any obvious constructional and functional equivalent falls within the scope of the present invention; both regarding, for example, the number and the shape of the steps and the choice of the inert and electrically insulating material, of which the above-mentioned steps are made, for example special refractory material shaped elements basically consisting of silicon carbide alloyed with silicium nitride. Also the obvious analogous applications to furnaces different from the above-described ones, fall within the scope of the present invention.

We claim:

1. A multicell furnace for the production of aluminum equipped with bipolar suspended electrodes and with a vat of refractory material, having a bottom provided with collecting pockets or troughs for collecting and tapping the aluminum produced through the electrolysis, in which said bottom is stepped shaped, all the steps having their own horizontal tread slightly inclined towards a collecting pocket, and the ratio between the number of said collecting pockets and the number of cells or electrode interspaces is smaller than or equal to 1:3.

2. The multicell furnace of claim 1, wherein the wall of the steps has a projecting vertical rise.

3. The multicell furnace of claim 1, wherein the edges of the steps have protruding shape in order to favor the tearing of the skin or the liquid metal stream flowing down towards the lowest point, or lowest points, of the vat bottom of the furnace itself.

4. The multicell furnace of claim 1, wherein the steps slope down from the ends of the furnace vat towards the central zone of it, where a single collecting pocket for the molten metal is placed.

5. The multicell furnace of claim 1, wherein the steps slope down from the central zone of the furnace vat towards the ends of it where two collecting pockets for the molten metal are placed.

6. Multicell furnace of claim 1, in which under every cell, preferably only one tread of a step is placed.

7. The multicell furnace of claim 1, wherein the edge of every tread of the steps surpasses the corresponding vertical rise of the same step, in order to absolutely break the thin film of molten metal.

References Cited

UNITED STATES PATENTS

| 2,480,474 | 8/1949 | Johnson | 204—225 X |
| 2,514,283 | 7/1950 | Lawson et al. | 204—245 |
| 3,400,061 | 9/1968 | Lewis et al. | 204—243 X |

FOREIGN PATENTS

| 21,822 | 11/1894 | Great Britain | 204—245 |

JOHN H. MACK, Primary Examiner

D. R. VALENTINE, Assistant Examiner

U.S. Cl. X.R.

204—245, 250